UNITED STATES PATENT OFFICE.

OSKAR HUGO ANDERSON, OF STOCKHOLM, SWEDEN, ASSIGNOR, BY MESNE ASSIGNMENTS, TO SILICATE BRICK SYNDICATE, OF MONTREAL, CANADA, A CORPORATION OF DELAWARE.

MANUFACTURE OF ARTIFICIAL STONE OR BRICK AND THE PREPARATION OF LIME THEREFOR.

SPECIFICATION forming part of Letters Patent No. 702,611, dated June 17, 1902.

Application filed December 4, 1901. Serial No. 84,659. (No specimens.)

*To all whom it may concern:*

Be it known that I, OSKAR HUGO ANDERSON, a subject of the King of Sweden and Norway, and a resident of Stockholm, Sweden, have invented Improvements in the Manufacture of Artificial Stone or Brick and the Preparation of Lime Therefor; and I do hereby declare that the following is a full, clear, and exact description of the same.

The invention relates to the manufacture of so-called "silicate stone" and the simultaneous preparation of the lime used in its manufacture.

The object of the invention is to simplify and improve the process in the following respects: First, dispensing with the introduction of water, low-pressure steam, or exhaust-steam into the chamber in which the brick-hardening and lime-slaking operation is carried on, and so avoiding all chance of excessive humidity during such operation; second, diminishing the quantity of lime required in the mixture of sand and lime used.

In carrying out the improved process a mixture of about ninety-five per cent. in weight of common sand and five per cent. of thoroughly slaked and dried lime, preferably also pulverized, is prepared and dry-mixed very thoroughly, after which sufficient water is added to moisten the mass, so that it can be molded into bricks or stones of any desired form. The bricks thus prepared are hardened in the usual manner by inclosing same within a hardening chamber or cistern, but subjecting them to the action of high-pressure steam only—*i. e.*, steam at not less than one hundred pounds per square inch—thus keeping the chamber at all times free from excessive humidity instead of introducing a quantity of water, low-pressure steam, or exhaust-steam, (resulting in an excess of moisture,) as has been the practice hitherto. The use of high-pressure steam only enables the customary simultaneous slaking (in the same chamber) of the lime used in the preparation of the brick mixture to be properly effected and with better results than heretofore. For instance, it has been ascertained by experiment that for the slaking of a quantity of lime corresponding with the five per cent. in the brick mixture sufficient moisture in vaporized form can (by the action of the steam resolving the sand and lime into silicate and water and releasing the free moisture taken into the chamber by the bricks) be derived from the bricks which are being hardened to thoroughly slake the lime located in the same chamber, but separate from such bricks, and consequently all necessity for introducing a special additional supply of water, low-pressure steam, or exhaust-steam, as heretofore, is avoided, with resulting simplification of the process and the removal of all chance of excessive humidity. Furthermore, the vaporized moisture produced is by the high pressure of the steam caused to permeate the unslaked lime so effectively that the lime is reduced to the finest pulverulent form. The chamber being free from excessive humidity from start to finish of the hardening operation is a distinctively novel feature of my process and contributes in a large measure to the improved product thereof in that the molded article is at no time while in the chamber liable by an excess of moisture to collapse, crack, or otherwise lose its original closely-pressed condition and form, and again, from the absence of any excess of moisture it results that the slaked lime being drier than it otherwise would be naturally assumes a finer pulverulent form, and as a consequence every portion unites effectively in the subsequent silicate formation of the brick mixture.

It is desirable where a much superior quality of brick is to be produced to continue the application of the steam for a short period beyond the time when the hardening of the bricks has been effected and the lime slaked in order to bring about even a finer pulverulent condition of the lime by such excessive drying, and, further, the lime after removal from the hardening-chamber may, if desired, be subjected to the action of any suitable pulverizer in order to grind as finely as possible all foreign substances which may have resisted the action of the steam or the dried lime be passed through a separator to free it from such foreign matters.

As an alternative for the continuation of the application of the high-pressure steam beyond the time required to slake the lime (as just mentioned) superheated steam may be employed instead of such continuation of the high-pressure steam to produce the same result in much less time and with a quicker setting or hardening of the bricks.

In order to obtain a harder material for the manufacture of silicate stone, the lime after being slaked in the manner mentioned is mixed with a certain percentage of sand and heated to redness. The mixture thus prepared then takes the place of the lime in the brick mixture, and in this case the mass is moistened with diluted hydrochloric acid instead of water before being pressed and treated with steam.

I am aware that the process of slaking lime in the same chamber with the bricks to be hardened has been heretofore known, such slaking being effected by the water of condensation falling upon it, and I am also aware, as above indicated, of the treatment of compositions including sand and lime by the application during the hardening process of low-pressure or exhaust steam followed by high-pressure steam; but I am unaware that it has ever been ascertained prior to my invention that high-pressure steam alone is sufficient and effective to act on the bricks in the chamber to vaporize the moisture therein, force such vaporized moisture without water of condensation through the unslaked lime most effectively, and harden the bricks, the chamber being throughout the operation quite free from excessive humidity.

What I claim is as follows:

1. The process of simultaneously making brick or other articles out of lime and sand and slaking lime, the same consisting in mixing the sand and lime with the minimum amount of moisture necessary to hold the mixture in form, next molding the mixture into the desired shape, inclosing the molded articles in a chamber together with a separate quantity of unslaked lime, and finally hardening the bricks, and slaking the lime by the application of high-pressure steam only, substantially as described.

2. The process of simultaneously making brick or other articles out of lime and sand and slaking lime, the same consisting in mixing the sand and dry-slaked lime in substantially the proportions specified, moistening the mixture with the minimum amount of moisture necessary to hold it in form, next molding the mixture, inclosing the molded articles in a chamber together with a quantity of unslaked lime approximately equal to that contained in the batch of articles to be hardened, and finally hardening the bricks and slaking the lime by the application of high-pressure steam only, the chamber being free from excessive humidity throughout the operation, substantially as described.

3. The process of making brick or other articles out of lime and sand, the same consisting in mixing substantially ninety-five parts by weight of silicious sand with five parts by weight of dry and finely-divided lime and with the minimum amount of moisture necessary to hold the mixture in form, next molding the mixture into the desired shape, inclosing the molded articles in a chamber, together with a quantity of unslaked lime approximately equal to that contained in the batch of articles to be hardened, and finally hardening the mixture and slaking the lime by the application of dry steam only at a pressure of not less than one hundred pounds to the square inch, the chamber being free from excessive humidity throughout the operation, substantially as described.

4. In the manufacture of silicate stone or bricks and the preparation of lime required therefor, first mixing a quantity of sand with a mixture, previously heated to redness, of sand and slaked lime, moistening the mass with diluted hydrochloric acid, pressing same into brick form, placing the bricks in a chamber and also placing in the same chamber, but separate from said bricks, a quantity of lime to be slaked, closing said chamber and introducing thereto high-pressure steam, whereby vaporized moisture will be derived from said bricks and caused to thoroughly permeate the separate quantity of lime to be slaked, as set forth.

In testimony whereof I have affixed my signature in presence of two witnesses.

OSKAR HUGO ANDERSON.

Witnesses:
FRED J. SEARS,
ARTHUR H. EVANS.